United States Patent
Katzberg et al.

[11] Patent Number: 5,949,364
[45] Date of Patent: Sep. 7, 1999

[54] METHOD AND SYSTEM FOR PRODUCING IMAGES OF AN OBJECT

[75] Inventors: Stephen J. Katzberg; James L. Garrison, Jr., both of Yorktown, Va.

[73] Assignee: The United States of America as represented by the Administration of the National Aeronautics and Space Administration, Washington, D.C.

[21] Appl. No.: 09/003,247

[22] Filed: Jan. 6, 1998

[51] Int. Cl.[6] ...................................................... G01S 13/00
[52] U.S. Cl. ........................ 342/25; 342/453; 342/357.01
[58] Field of Search .............................. 342/25, 52, 126, 342/357, 453, 357.01

[56] References Cited

U.S. PATENT DOCUMENTS

| | | |
|---|---|---|
| H1181 | 5/1993 | Rihaczek ..................................... 342/25 |
| 4,828,382 | 5/1989 | Vermilion ..................................... 356/1 |
| 4,990,922 | 2/1991 | Young et al. ............................... 342/52 |
| 5,438,337 | 8/1995 | Aguado ..................................... 342/357 |
| 5,469,167 | 11/1995 | Polge et al. ................................. 342/25 |

*Primary Examiner*—Mark Hellner
*Attorney, Agent, or Firm*—Linda B. B. Blackburn

[57] ABSTRACT

A method and system are provided to produce images of an object. A receiving station is positioned in view of a range-coded signal emitting satellite and the object. The receiving station is sensitive to direct transmission of the range-coded signal and reflections of the range-coded signal from the object. Both range from the receiving station to the object and a Doppler frequency shift history between the receiving station and the object is determined using the direct transmission and reflections of the range-coded signal. An image is formed using the two-dimensional record provided by the range and the Doppler frequency shift history.

16 Claims, 2 Drawing Sheets

METHOD AND SYSTEM FOR PRODUCING IMAGES OF AN OBJECT

CROSS REFERENCE TO RELATED PATENT APPLICATIONS

This application relates to copending commonly owned patent application Ser. No. 09/003,382 filed Jan. 6, 1998 entitled "METHOD AND SYSTEM FOR MONITORING SEA STATE USING GPS".

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to imaging methods and systems. More specifically, the invention is a method and system for producing images of an object using signals from existing satellites transmitting unique range-coded signals.

2. Description of the Related Art

The radiowave imaging of objects from spacecraft, aircraft, watercraft or other vehicles/platforms has traditionally utilized a radar transmitter and a radar receiver. For certain low level implementations, the receiver and transmitter can be located on separate platforms or locations. For space applications, both transmitter and receiver are on the same platform (i.e., a spacecraft). The transmitter must transmit a radio frequency pulse or signal towards the object for reflection therefrom. However, this transmission can be detected thereby eliminating the element of covertness or surprise. In addition, the need for a transmission system increases platform weight and complexity as well as increasing reliability risks.

SUMMARY OF THE INVENTION

Accordingly, it is an object of the present invention to provide a method and system for producing images of objects.

Another object of the present invention is to provide a method and system for producing images of objects without requiring the use of a transmitter.

Other objects and advantages of the present invention will become more obvious hereinafter in the specification and drawings.

In accordance with the present invention, a method and system are provided to produce images of an object. A satellite (e.g., GPS, GLONASS, etc.) in line-of-sight of an object transmits a range-coded signal. A receiving station is positioned in view of the satellite and object. The receiving station is sensitive to direct transmission of the range-coded signal and reflections of the range-coded signal from the object. It is necessary to have or introduce relative motion between the receiving station and the object. Range from the receiving station to the object is determined using the direct transmission and reflections. A Doppler frequency shift history between the receiving station and the object is also determined using the direct transmission and reflections. An image of the object is formed using the two-dimensional record provided by the range and the Doppler frequency shift history.

DETAILED DESCRIPTION OF THE INVENTION

The present invention produces images of objects from a remote location. It is to be understood that the objects can be stationary or moving, and can be located on the earth's surface (i.e., on land or water) or in the air. The remote location can be onboard watercraft, spacecraft, aircraft, balloons, or ground vehicles/structures.

Figure 1:
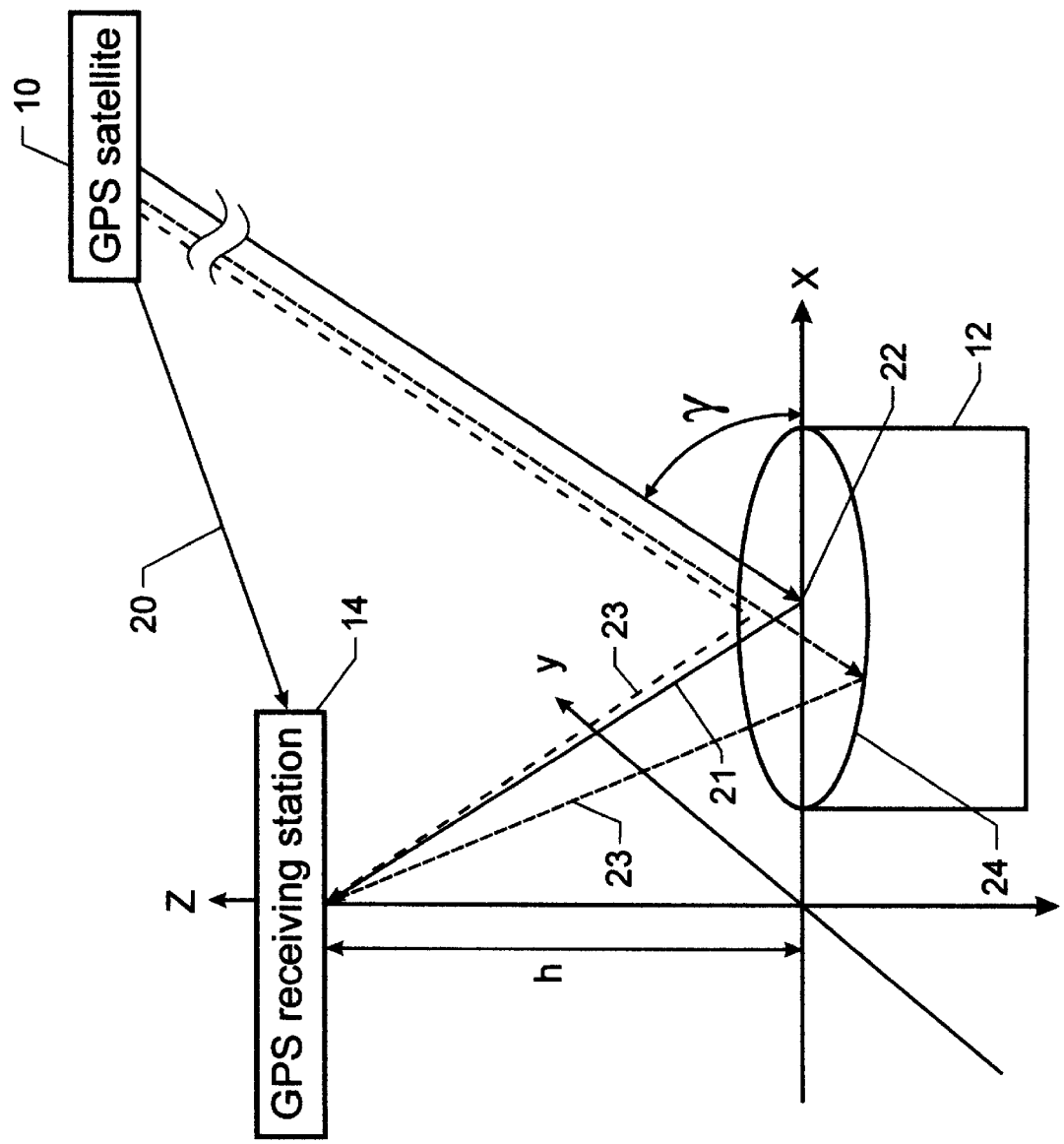
FIG. 1 is a diagrammatic illustration of the paths traversed by the direct and object-reflected transmissions of a Global Positioning System (GPS) signal prior to their detection by a receiving station in the present invention.

Before describing the method and system of the present invention, some principles used thereby will be described with the aid of FIG. 1. In FIG. 1, a Global Positioning System (GPS) satellite is referenced by numeral 10. An object 12 resides in the x-y plane and is capable of reflecting radio signal transmissions such as range-coded signals transmitted by GPS satellite 10. A GPS receiving station 14 is shown positioned in line-of-sight of object 12 at, for example, a height h thereabove as measured along the z-axis. It is assumed herein that GPS receiving station 14 is capable of receiving and processing GPS signals as will be described further below.

It is also assumed that object 12 is highly reflective with respect to radio frequency (RF) waves. The position of object 12 relative to satellite 10 and receiving station 14 determines whether the reflections are forward scattered or back scattered. The present invention will function with either type of reflection and thus offers a flexibility that is not available in conventional radar which is limited to operation in the back scatter mode. For the illustrated embodiment, object 12 is positioned between GPS satellite 10 and receiving station 14 (so that the reflections are forward scattered) with relative motion occurring between object 12 and receiving station 14. To guarantee and control such relative motion, receiving station 14 is typically located on a movable platform whose movement is controlled.

While the present invention will be described relative to GPS, it is to be understood that alternate embodiments of the invention could use the GLONASS Russian positioning system which is similar to GPS in that both use range-coded signals. Receiving station 14 can employ either the standard "C/A" code or the higher resolution "P" code for military and certain civilian users.

GPS signals transmitted from GPS satellite 10 travel directly to receiving station 14 (as referenced by numeral 20) and indirectly to receiving station 14 as reflections from object 12 (as referenced by numeral 21). In the present invention, it is assumed that reflected signal 21 can also be detected by receiving station 14. At any given instant or range interval as it is known, the time delay associated between the arrival of direct signal 20 and reflected signal 21 is indicative of the range from receiving station 14 to object 12.

For proper imaging, it is also necessary to determine at each range interval the angular relationship between receiving station 14 and object 12. Since there is relative movement between receiving station 14 and object 12, a Doppler frequency shift history between direct signal 20 and reflected signal 21 is indicative of the angular relationship between receiving station 14 and object 12. The Doppler frequency shift is dependent on the azimuth angle from the line of motion of receiving station 14 to object 12 and is proportional to the relative speed between receiving station 14 and object 12 in each range interval. The Doppler frequency shifts permit the differentiation of signals 20 and 21 within the range intervals. Thus, the range and Doppler frequency shift history provides a two-dimensional record of object 12 suitable for producing an image thereof. If navigational data is available from receiving station 14, the range and Doppler data could be combined therewith to provide a mapping of object 12 relative to its surrounding environment. In either case, the image data can be stored for later retrieval/processing and/or made available immediately on a video display or on a hard copy medium.

If necessary, more detail about object 12 can be provided by the present invention. The degree to which signal 21 is reflected and easily detected by receiving station 14 depends on the characteristics of object 12. If object 12 has a smooth surface, reflected signal 21 is only slightly modified from signal 20 arriving directly from GPS satellite 10. In such cases, reflected signal 21 can be thought of in a fashion similar to light reflecting from a mirror. The reflection comes from a point 22 called a specular point which follows the laws of optics for mirror reflection. Thus, reflected signal 21 appears to come from a point behind the mirror at a distance exactly the same as if GPS satellite 10 were behind the surface of reflection.

If the surface of object 12 is varied or faceted, the reflections are scattered over a broader area. That is, reflected signals do not originate from just specular point 22. Instead, reflections from areas of object 12 farther from specular point 22 are detectable by receiving station 14. The loci of constant delay from specular point 22 can be modeled as an ellipse 24 centered on specular point 22. As a result, reflections of detectable power arriving at receiving station 14 extend out to the perimeter of ellipse 24 as indicated by dashed lines 23. Reflected signals 23 take longer to arrive at receiving station 12 than reflected signal 21. Thus, the degree to which signal power is clustered or correlated in time about specular point 22 gives a direct indication of characteristics of the surface of object 12. For example, if the reflected signal power is clustered in a narrow range of time delay, object 12 has a smooth surface as the reflected signal is essentially originating from specular point 22. If, however, reflected signal power is broadly distributed over a range of time delays, the surface of object 12 can be assumed rough or faceted as reflected signals originate from the whole area of ellipse 24. Thus, the reflected signal power can be combined with the above-described range and Doppler frequency shifts to provide a characteristic image of object 12.

Figure 2:
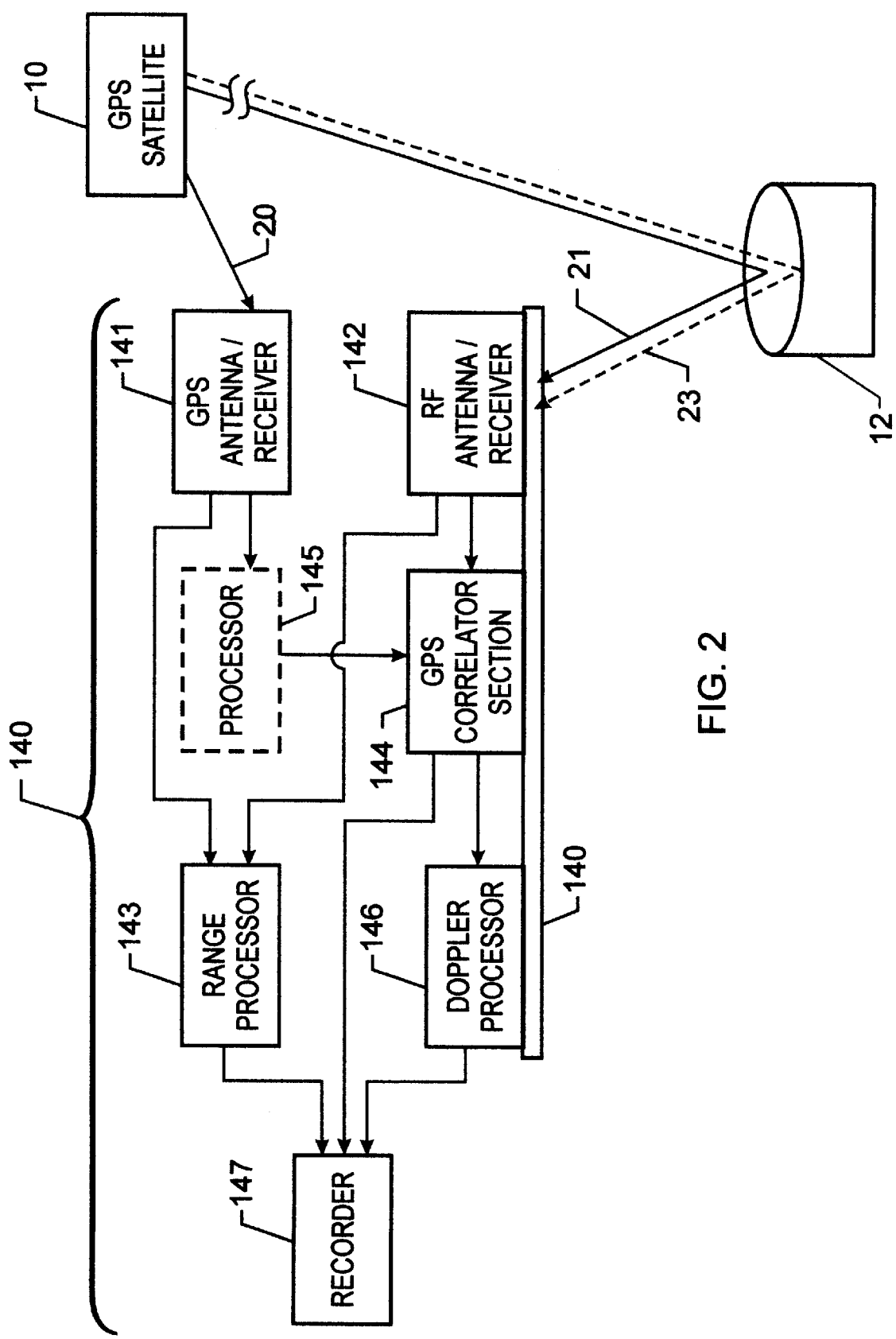
FIG. 2 is a block diagram of a system used to implement the method of the present invention that is based on GPS reflections from an object.

Referring now to FIG. 2, one embodiment of receiving station 14 for implementing the present method is shown. For completeness, receiving station 14 will be described relative to forming a characteristic image of object 12. Accordingly, receiving station 14 is shown equipped to determine and use the above-described range, Doppler frequency shifts and reflected signal powers in forming an image of object 12. However, it is to be understood that it is only necessary to determine/use the range and Doppler frequency shifts to image object 12.

Receiving station 14 is mounted on a movable platform or vehicle 140. A GPS antenna/receiver 141 mounted on platform 140 is capable of detecting the digital, range-coded RF signal 20 transmitted by at least one GPS satellite such as GPS satellite 10 described above. An RF antenna/receiver 142 is positioned onboard platform 140 and is sensitive to reflected signals 21 and 23. Range from receiving station 14 to object 12 is determined at a range processor 143 coupled to GPS antenna/receiver 141 and RF antenna/receiver 142. Range processor 143 determines the time delay between direct signal 20 and reflected signal 21 as an indication of range.

The power output associated with each detected reflection signal 21 and 23 is also passed to a GPS correlator section 144 which correlates each reflection signal 21 and 23 with the pseudo random noise (PRN) code associated with GPS satellite 10. Briefly, as is known in the art, the PRN code is a digital sequence of "−1's" and "1's" that uniquely identifies GPS satellite 10 relative the other GPS satellites (not shown) in orbit about the earth.

The PRN code from GPS satellite 10 could be made available to correlator section 144 in a variety of ways. Typically, as in the illustrated example, GPS antenna/receiver 141 provides the particular PRN code associated with GPS satellite 10. The manner of detecting a GPS satellite's PRN code is well known in the art and will therefore not be described herein.

In accordance with the present invention, correlator section 144 correlates the digital PRN code associated with GPS satellite 10 with each of reflected signals 21 and 23. Since the PRN code in the GPS system is digital, correlation is facilitated by utilizing a digitized form of reflected signals 21 and 23. Analog-to-digital signal conversion can be accomplished in RF antenna/receiver 142.

Correlation, as used herein, involves the multiplication and summing of all or part of the PRN code associated with GPS satellite 10 with each of reflected signals 21 and 23. Each multiplication and summation results in a value indicative of signal strength which, when squared, is indicative of signal power. In order to characterize the surface of object 12, the PRN code must be correlated with each reflected signal over a range of time delays or phase shifts where the phase shifts are between the PRN code and each reflected signal. That is, the PRN code is shifted and multiplied by each reflected signal in order to determine how broad a range of phase shifts will produce significant correlator (i.e., signal power) outputs. The broader the range of phase shifts that produce correlator outputs, the rougher or more faceted the surface of object 12 since significant reflection occurs from a broad area. However, when signal power outputs are clustered over a narrow range of phase shifts, the surface of object 12 is smooth since reflection is localized about a single specular point.

In the present invention, correlation can occur serially as correlator section 144 processes each reflected signal with the PRN code over a plurality of phase shifts in order to determine the correlator outputs as a function of phase shift. Processing efficiency can be improved, however, by having correlator section 144 constructed as a plurality of correlator subsections. Each such correlator subsection would be supplied in parallel with the PRN code, the reflected signals and a non-overlapping portion of the phase shifts. The correlator subsections would operate in parallel to provide correlator outputs across the entire range of phase shifts.

Further control of correlator section 144 can be achieved by the provision of a processor 145 shown in dashed-line form to signify its optional nature. Processor 145 could be used, for example, to provide predictions as to the applicable range of phase shifts that should be processed for any given GPS satellite 10. This would reduce the search time required to develop meaningful correlator outputs. Such predictions can be based on the height differential h between receiving station 14 and object 12 and the grazing angle y that the reflected signals make with object 12 as best seen in FIG. 1. More specifically, the expected smooth-surface delay between the arrival of direct signal 20 versus reflected signal 21 is given by (2h) sin γ

The values for h an y can be easily determined by means of standard GPS triangulation procedures which would be carried out by GPS antenna/receiver 141.

Finally, the Doppler frequency shift history between receiving station 14 and object 12 is determined at Doppler processor 146. As described above, the Doppler shifts are based on the frequency difference between direct signal 20 and reflected signals 21 and 23. As is known in the art, Doppler processor 146 can be implemented using standard synthetic aperture radar (SAR) processing techniques as described in, for example, "Microwave Remote Sensing, Active and Passive," by Ulaby et al., Artech House, Norwood, Mass. 1986. Note that Doppler processor 146 is coupled to correlator section 144 because it is through the correlation process that frequency reconstitution of the transmitted and modulated GPS signal is accomplished. Thus, for a given locus of constant range from the receiver, the various target Doppler histories can be determined.

Completion of the imaging process is achieved by recording the outputs of range processor 143, correlator section 144 and Doppler processor 146 at recorder 147. More specifically, the range to object 12 provided by range processor 143 and the Doppler frequency shift history from Doppler processor 146 provide a two-dimensional record necessary to form an image of object 12. The power outputs from correlator section 144 provide further detail about object 12 so that the image can represent characteristics of object 12. Recorder 147 can be implemented by means of, for example, a video display, a printer or a storage device.

While the present invention has been described relative to its use with one visible GPS satellite, it is to be understood that the present invention could make use of multiple, visible GPS satellites with the reflected signals from each satellite undergoing the same type of signal processing. Since each satellite has its own PRN code, reflected signals are easily delineated.

The advantages of the present invention are numerous. Objects can be imaged/mapped without the need for a transmitter. The continuously-available GPS (or GLONASS) range-coded signals can be easily processed by available technology. Thus, the present invention can be easily added to existing GPS receiver systems. In addition, the method can avail itself of forward scattering of radio frequency waves which typically provides a stronger signal than the back scattering relied upon by conventional radar.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of producing images of an object, comprising the steps of:

provriding a satellite in line-of-sight of an object, said satellite being capable of transmitting a range-coded signal;

positioning a receiving station in view of said satellite and said object, said receiving station being sensitive to direct transmission of said range-coded signal from said satellite and reflections of said range-coded signal from said object;

introducing relative motion between said receiving station and said object;

determining range from said receiving station to said object using said direct transmission and said reflections;

determining a Doppler frequency shift history between said receiving station and said object using said direct transmission and said reflections; and forming an image of said object using said range and said Doppler frequency shift history.

2. A method according to claim 1 wherein said step of positioning includes the step of positioning said object between said satellite and said receiving station.

3. A method according to claim 1 wherein said step of introducing includes the step of controlling movement of said receiver.

4. A method according to claim 1 wherein said satellite is selected from the group consisting of Global Positioning System (GPS) satellites and GLONASS satellites.

5. A method according to claim 1 wherein said step of determining said Doppler frequency shift history is accomplished using synthetic aperture radar (SAR) processing techniques.

6. A method according to claim 1 further comprising the step of storing said range and said Doppler frequency shift history.

7. A method according to claim 1 further comprising the steps of:

providing a reference code indicative of said range-coded signal transmitted from said satellite; and correlating said reference code with each of said reflections for each of a plurality of phase shifts between said reference code and each of said reflections to generate a plurality of power outputs, wherein said step of forming uses said range, said Doppler frequency shift history and said plurality of power outputs.

8. A method according to claim 7 further comprising the steps of:

determining a location of said receiver; and selecting said plurality of phase shifts using said location.

9. A method according to claim 7 wherein said step of correlating is performed as a serial process for each of said reflections.

10. A method according to claim 7 wherein said step of correlating is performed as a parallel process on non-overlapping portions of said plurality of phase shifts for each of said reflections.

11. A system for producing images using a range-coded signal that is transmitted toward the earth from an orbiting satellite, comprising:

receiving means positioned such that an object to be imaged is in view of said satellite and said receiving means and such that there is relative motion between said receiving means and said object, said receiving means being sensitive to a direct transmission of said range-coded signal and to reflections of said range-coded signal from said object;

processing means coupled to said receiving means for determining range from said receiving means to said object using said direct transmission and said reflections, and for determining a Doppler frequency shift history between said receiving means and said object using said direct transmission and said reflections; and a device coupled to said processing means for forming an image of said object using said range and said Doppler frequency shift history.

12. A system as in claim 11 wherein said processing means includes a correlator for correlating a reference code indicative of said range-coded signal transmitted from said satellite with each of said reflections for each of a plurality of phase shifts between said reference code and each of said reflections, wherein a plurality of power outputs associated with each of said reflections are generated, and wherein said device for forming an image of said object uses said range, said Doppler frequency shift history and said plurality of power outputs.

13. A system as in claim 12 wherein said correlator comprises a plurality of correlator subsections, each of said correlator subsections being provided with said reference code, each of said reflections, and a non-overlapping portion of said plurality of phase shifts, wherein said plurality of correlator subsections operate in parallel to generate said plurality of power outputs.

14. A system as in claim 12 further comprising a device for predicting said plurality of phase shifts.

15. A system as in claim 14 wherein said device for predicting comprises:

a locating system positioned in proximity to said receiving means for determining a location of said receiving means relative to said satellite; and a processor coupled to said locating system for generating predictions of values for said plurality of phase shifts based on said location.

16. A system as in claim 15 wherein said satellite is a Global Positioning System (GPS) satellite and said locating system is a GPS receiver.

* * * * *